United States Patent [19]
Bauer et al.

[11] 3,878,933
[45] Apr. 22, 1975

[54] CONVEYOR SYSTEM AND CONTROL

[75] Inventors: Kunibert Bauer, Nagold; Manfred Guttinger, Leinfelden, both of Germany

[73] Assignee: Sandco Limited, Ottawa, Canada

[22] Filed: Apr. 29, 1974

[21] Appl. No.: 465,348

[52] U.S. Cl. ............... 198/38; 198/232; 317/41; 340/252 E; 340/259
[51] Int. Cl. ............................................. B65g 43/00
[58] Field of Search ............... 198/38, 40, 232; 340/248 E, 252 A, 252 E, 259; 317/41

[56] References Cited
UNITED STATES PATENTS
| | | | |
|---|---|---|---|
| 3,214,003 | 10/1965 | Wilson | 198/38 |
| 3,486,607 | 12/1969 | Hacker et al. | 198/38 |
| 3,666,080 | 5/1972 | Alfredsson | 198/38 |

*Primary Examiner*—Evon C. Blunk
*Assistant Examiner*—Richard K. Thomson
*Attorney, Agent, or Firm*—Curtis, Morris & Safford

[57] ABSTRACT

An article conveying system for conveying articles from a loading station to one of several receiving stations. The conveyor belt is a steel band which is adapted to be selectively magnetized in discrete areas for each article carried thereby. The selective magnetization is in accordance with a predetermined code and represents a selected one of the receiving stations to which a corresponding article is destined. Sensing devices are disposed respectively at the various receiving stations for sensing the signal components of the selective magnetization and for determining the destination of each article, whereupon the conveyed article is discharged thereto. In the vicinity of the loading station, magnetizing means are provided for selectively magnetizing the conveyor belt to thereby select a predetermined receiving station for each loaded article. The magnetizing means includes electromagnet means having windings through which current selectively flows through a controllable semiconductor for a chargeable capacitor. The capacitor is charged through a charging circuit that includes a positive-temperature-coefficient resistor.

16 Claims, 6 Drawing Figures

1

CONVEYOR SYSTEM AND CONTROL

BACKGROUND OF THE INVENTION

This invention relates to an article conveying system for conveying articles from a loading station to one of several receiving stations by the use of a conveyor belt and, in particular, to such a system wherein the conveyor belt contains a magnetizable material in which is produced, preferably at a predetermined distance from an edge of the conveyed article, at least one magnetized area which is sensed at the receiving stations so as to bring about the discharge of the article at a particular station, depending upon the type and/or position of the magnetized area.

Programmable article conveyor systems are disclosed in U.S. Pat. No. 3,666,080 issued May 30, 1972, and assigned to the assignee of the present invention. These systems work most satisfactorily. However, it has been found that for some conditions of operation the known systems require careful adjustment to assure trouble-free operation in all cases. In particular, to attain proper magnetization of the magnetizable material of the conveyor belt, an electromagnet device is provided and is supplied with a relatively high magnetizing current. The current flow through the electromagnet device must be switched to produce the desired selected magnetization areas of the conveyor belt. To avoid deleterious operation of this magnetizing apparatus caused by overheating, the magnetizing current normally flows only for a short duration. Appropriate current controlling devices thus are provided preferably of the semiconductor-type.

However, if the current controlling devices, and in particular the semiconductor elements thereof, become defective so that current flows through the electromagnet device constantly, this relatively high magnetizing current may cause faulty switching so that improper magnetization areas are produced. Consequently, the conveyed article will be delivered to the wrong receiving station. Additionally, the winding of the electromagnet device might be damaged or even destroyed.

OBJECTS OF THE INVENTION

It is an object of the present invention to provide an improved article conveyor system wherein the attendant disadvantages of prior systems are avoided. It is another object of this invention to provide apparatus wherein the prolonged flow of magnetizing current through an electromagnet device is prevented. A further object of the present invention is to provide apparatus for use in an article conveyor system wherein magnetized areas in a conveyor belt are positioned accurately so that conveyed articles are delivered to the proper, preselected receiving stations. Yet another object is to provide an improved article conveyor system of the type wherein each article is automatically conveyed to the selected one of a number of receiving stations by a conveyor belt, and wherein the occurrence of an operating fault is visually indicated. A still further object of the present invention is to provide an improved article conveyor system wherein the article conveying medium is coded with representations indicative of the receiving stations to which various ones of the conveyed articles are directed and wherein the occurrence of a fault does not cause erroneous destination coding. Various other objects and advantages of the present invention will become clear from the forthcoming explanation, and the novel features will be pointed out in the appended claims.

SUMMARY OF THE INVENTION

In accordance with the present invention, an article conveyor system is provided with magnetizing means for producing magnetized areas in the conveyor medium, the magnetizing means having a chargeable capacitor; a controllable semiconductor element for controlling the discharge of said capacitor through a winding of an electromagnet; and a positive-temperature-coefficient (PTC) resistor in the charging circuit of said capacitor. A relatively high current, flows through the winding of the electromagnet only for a short time so that the electromagnet will not appreciably heat up, while a strong and well-defined magnetized area is produced. If the semiconductor element becomes defective and conducts constantly, the PTC resistor will acquire so high a value that only a small residual current can flow through the winding, and this will not result in faulty switching and will not overheat the winding.

It is particularly advantageous to construct the PTC resistor as an incandescent lamp. When the controllable semiconductor element becomes defective, the lamp, if appropriately dimensioned, will light steadily, thus giving an excellent optical indication of the fault.

A further improvement in an article conveyor is attained by the present invention by providing magnetizing means which comprises an electromagnet with a U-shaped core, wherein the end faces of the legs of said core face the conveyor belt containing magnetizable material. While in the arrangement in accordance with prior systems an electromagnet having but one leg is employed, with stray fields causing a fairly strong magnetization of opposite polarity about the magnetized spot, the arrangement in accordance with the instant invention produces a strong concentration of the field between the legs of the U-shaped core, and thus a high amplitude of the magnetization of the desired polarity, so that a faulty magnetization area and erroneous detection is avoided with certainty even when the belt is bent at a given point due to mechanical stresses, with the result that it passes the magnetizing means and subsequently the sensing head with greater than the desired magnetized spot separation.

BRIEF DESCRIPTION OF THE DRAWINGS

The present invention will best be understood from the following detailed description taken in conjunction with the drawings in which.

DETAILED DESCRIPTION OF A CERTAIN PREFERRED EMBODIMENT

Figure 1:
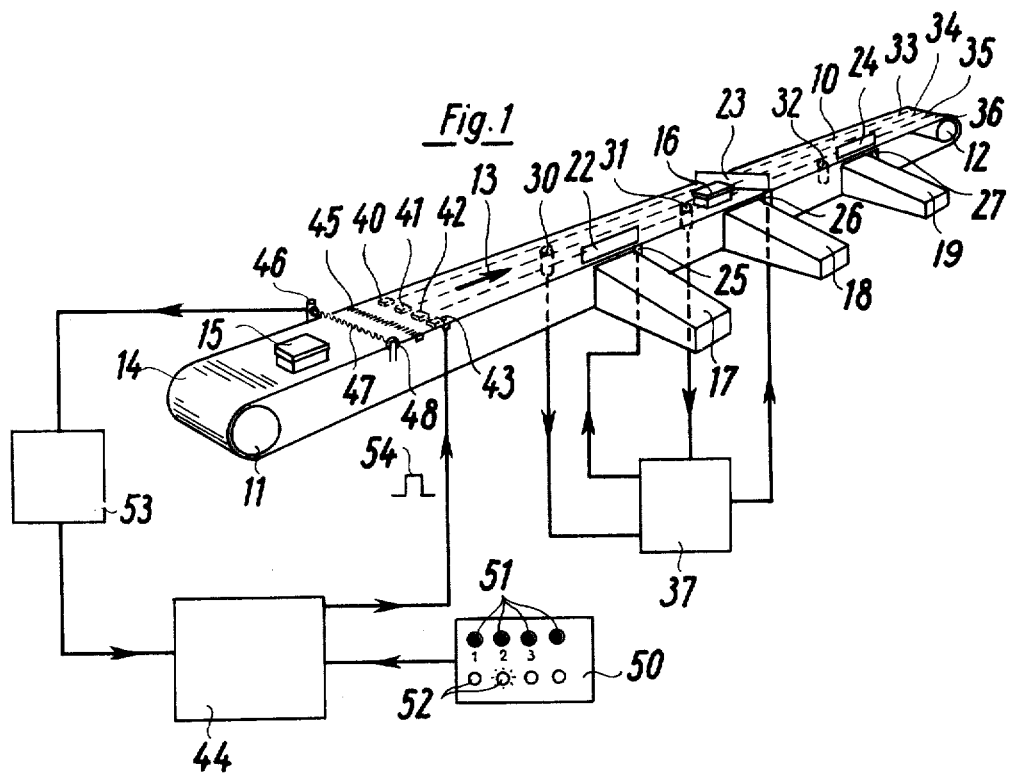
FIG. 1 is a diagrammatic representation of a system in accordance with the invention.

As shown diagrammatically in FIG. 1, a steel conveyor belt 10 is mounted on end rollers 11 and 12 and is driven by these rollers through a motor (not shown) in the direction indicated by arrow 13 so that articles — for example, the two boxes designated 15 and 16 — placed on the belt 10 at a loading station 14 will be carried from the left to the right. Disposed along the belt 10 are various receiving stations, of which only three, namely, stations 17, 18 and 19, are shown in FIG. 1 so as to simplify the drawing. In practice, as many as 100 stations may be located on either or both sides of the belt. Each station has a deflecting member 22 or 23 or 24, respectively, of which member 23 is shown in its deflecting position wherein it deflects box 16 to station 18 while the member 22 and 24 are in their at-rest positions. The deflecting members 22 to 24 are controlled by electrohydraulic control apparatus 25, 26 and 27, which in FIG. 1 are shown merely diagrammatically.

Associated with each receiving station is a sensing heads 30 or 31 or 32, respectively, located at a particular point of the belt. The belt 10 in accordance with FIG. 1 may be thought of as divided into four parallel longitudinal zones 33 to 36, for example. Sensing head 30 then is located under zone 34, for example, head 31 under zone 35, and head 32 under zone 36. Moreover, the heads are constructed so that they will respond only if the belt section passing over them is properly magnetically polarized. For example, sensing head 30 may be constructed so that it will respond only when a magnetic north pole is present in longitudinal zone 34 of the belt aligned with the sensing head. In that case, the head will deliver a signal to a timing element 37, and this will cause the electrohydraulic control member 25 to be energized and hence the deflecting member 22 to be swung out. To keep the drawing relatively uncomplicated, the timing element for receiving station 19 is not shown. It is recognized that its circuitry is identical to element 37, that is to say, the signal supplied by the sensing head 32 is fed to its input, and its output controls and deflecting member 24 through the electrohydraulic control apparatus 27.

To produce the desired magnetizations in the steel belt 10, there are disposed beneath it four magnetizing means 40 to 43 which are in alignment with the longitudinal zones of the belt and which are individually connected to control apparatus 44. Control apparatus 44 may be of the type disclosed in copending Application Ser. No. 448,375 filed on Mar. 5, 1974, and determines which of the means 40 to 43 is to be energized, and also, the polarity with which the magnetizing means is to magnetize the belt 10. The means selected then will produce a magnetic "spot" on belt 10, that is to say, if iron filings are sprinkled on the belt, a spotlike configuration will be obtained by the fillings at the magnetized point. The magnetic spot can cause only one of the sensing heads 30 to 32 to respond, and the station associated with the responsive sensing head then is operable as the receiving station.

Disposed upstream of the magnetizing means 40 to 43 is a demagnetizing means 45, and upstream of the latter a photoelectric cell comprising a combined light transmitter and receiver 46 which transmits modulated light 47 to a mirror 48 from which it is reflected to the receiver 46 when no article being conveyed lies in the path of the light beam.

When the article to be conveyed is placed on the belt 10 at loading station 14, the operator energizes at an input station 50 a key 51 corresponding to the predetermined receiving station of said article, for example, key "2" for station 18, whereupon a corresponding lamp 52 ia lighted for visual confirmation of station selection, as shown schematically in FIG. 1. The signal from input station 50 passes to the control apparatus 44, where it is stored until an article to be conveyed — box 15, for example — passes the photocell 46 to 48. At that instant the photocell delivers a signal which activates a timing element 53 whose output signal is fed to the control apparatus 44, which then, for the duration of the signal from timing element 53, transmits the stored signal in the form of a pulse 54 to the associated magnetizing means, in this case, the magnetizing means 42, for example. The magnetizing means responds to the signal transmitted thereto so as to produce a magnetic spot in the longitudinal zone 35. When this magnetic spot traverses the sensing head 31, it triggers a signal therein, thereby causing box 15 to be deflecting member 23 to station 18, in other words, to the station determined by the produced magnetic spot.

The precise functioning of the system in accordance with the invention obviously is largely dependent upon the reliable and fail-safe operation of the magnetizing means even under the difficult operating conditions encountered in practice. This accomplished through the present invention.

Figure 2:
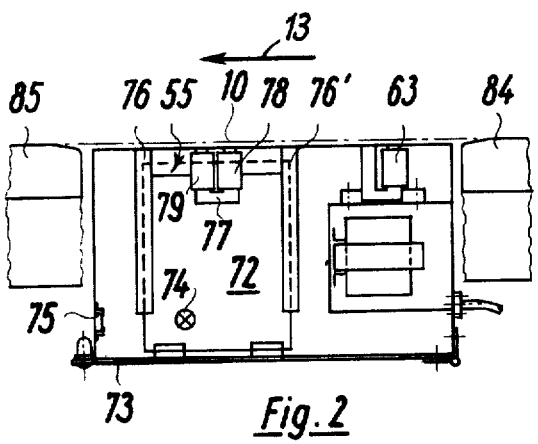
FIG. 2 is a section through an embodiment of a system in accordance with the invention, taken along line II–II in FIG. 4.
Figure 3:
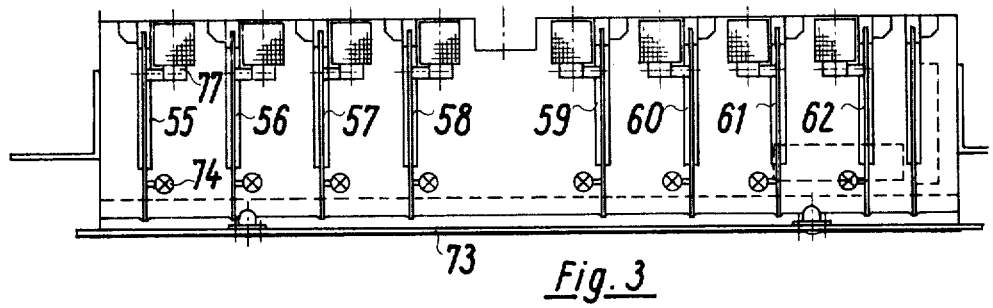
FIG. 3 is a section taken along line III—III in FIG. 4.
Figure 4:
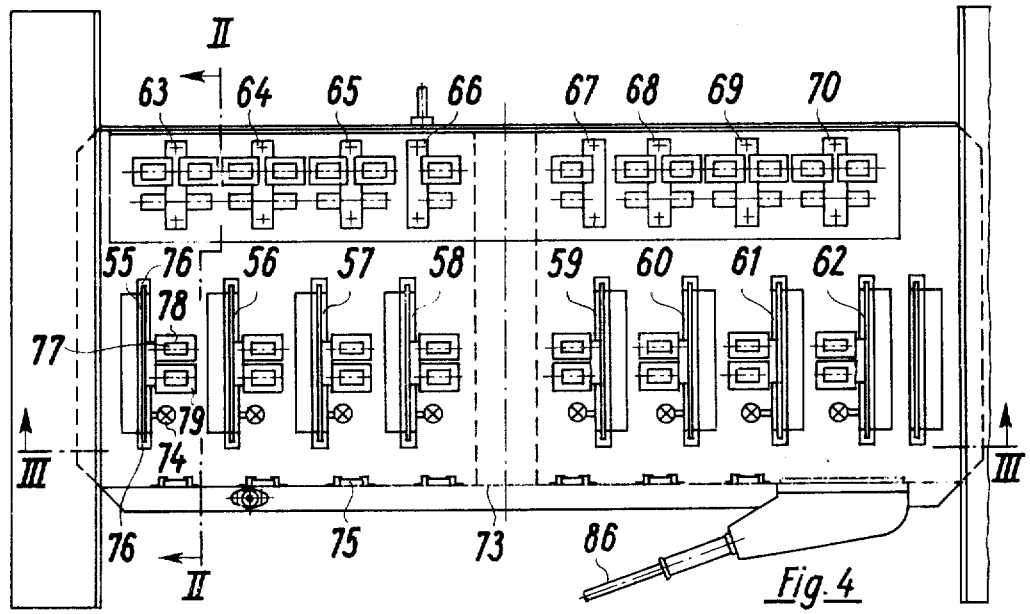
FIG. 4 is a plan view of the embodiment in accordance with FIGS. 2 and 3.
Figure 5:
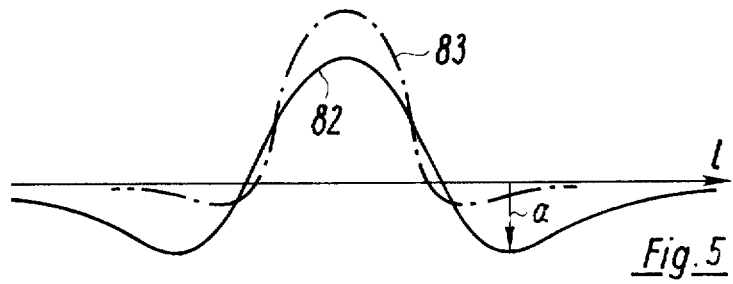
FIG. 5 is a graphic representation of the permanent magnetization of one area of the conveyor belt, measured lengthwise of the conveyor system.

FIGS. 2 to 4 show, as a modification of FIG. 1, a magnetizing means constructed for a belt having, for example, eight longitudinal zones, for which reason eight magnetizing means 55 to 62 are provided, as well as eight demagnetizing means 63 to 70. As may be seen from FIG. 2, the individual magnetizing means, which are all identical, are constructed as plug-in, or replaceable, circuit boards 72 on which are mounted the electrical circuit elements and an incandescent lampl 74, which is visible through a window 75 provided in the case 73. The circuit boards are preferably disposed beneath the upper run of the belt 10 and arranged in depending relation. At the upper end of the circuit board, which is inserted in guide channels 76 and 76', there is disposed a U-shaped iron core 77 whose two legs are provided with identical windings 78 and 79, respectively, for reasons of symmetry. The end faces of the legs of the U-shaped core 77 are located beneath the steel belt 10, and lie in a plane that is substantially parallel to the direction of travel of the belt and spaced a small distance (of about one-half centimeter) therefrom. This core arrangement offers the advantage of better concentration of the magnetic field over that of prior systems. While in the magnetizing means in accordance with prior systems the magnetization over the longitudinal axis *l* of the belt exhibits approximately the pattern 82 in FIG. 5, which results in a fairly large amplitude of undesired magnetization due to stray fields, in the arrangement in accordance with the invention the stray fields are very much smaller, and the favorable magnetization pattern 83 is obtained.

Arranging the individual magnetizing means 55 to 62 on circuit boards such as 72 makes it possible to replace them in a minimum of time in case of a defect.

As may be seen from FIG. 2, guide members 84 and 85, respectively, made of nonmagnetic material, such as wood, are provided to the left and to the right of the magnetizing means for precise guidance of the belt 10. The guide members permit precise adjustment of the spacing between belt 10 and the cores 77. In FIG. 4, 86 designates the conducting leads for the circuit elements to the control apparatus 44.

Figure 6:
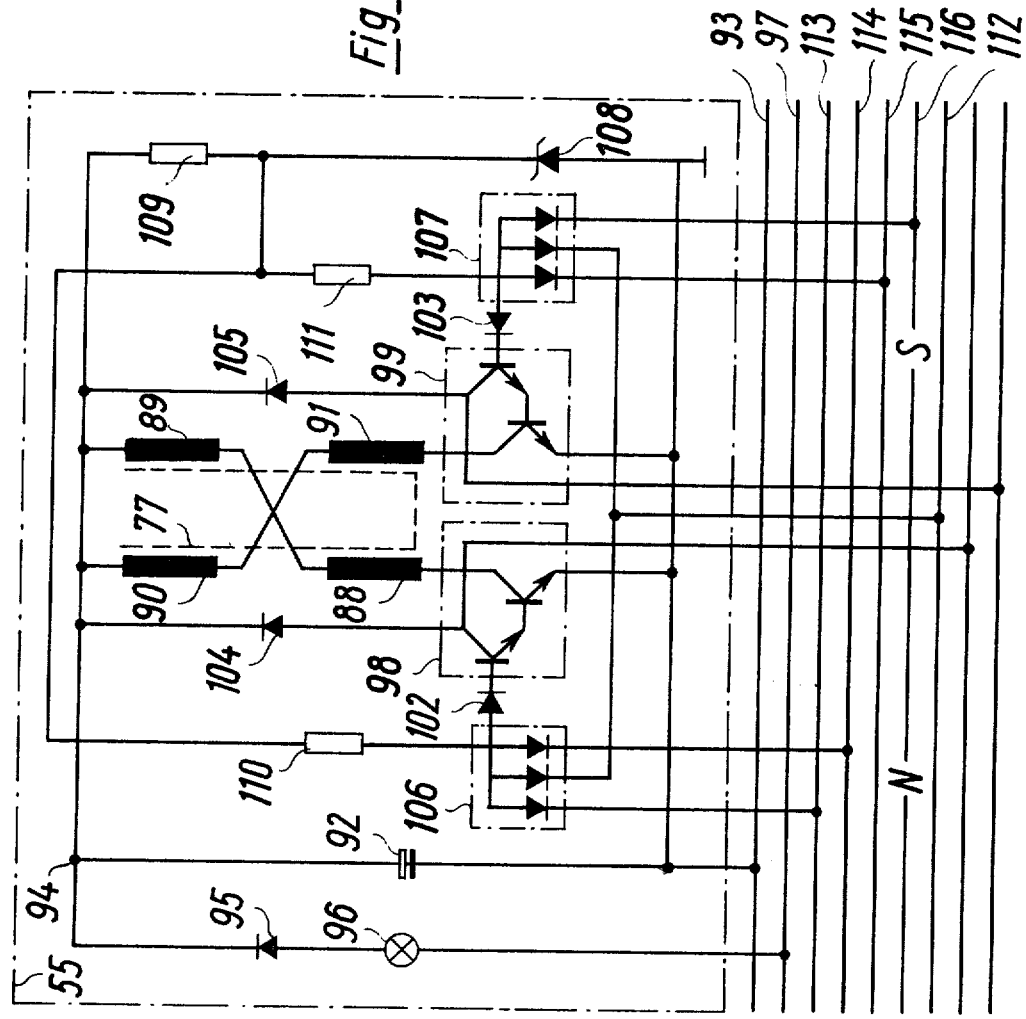
FIG. 6 is an embodiment of the circuit of a system in accordance with the invention.

The circuit diagram of a magnetizing means and associated circuit elements in accordance with the invention, for example, the magnetizing means 55 depicted in FIG. 2 to 4, is shown in FIG. 6. For the production of magnetization of north polarity, for example, the left leg of the core 77 has a winding 88 and its right leg a winding 89, while for the production of magnetization of south polarity the left leg of the core has a winding 90 and its right leg a winding 91. The windings 88 and 90 correspond to the winding 78 in FIG. 2, and the winding 89 and 91 correspond to the winding 79.

For supplying the windings with magnetizing current, a capacitor 92 (of 3,000 microfarads, for example) is provided. One of the capacitor electrodes is connected to a ground wire 93 while the other electrode is connected through a junction 94, a diode 95 and an incandescent lamp 96 to a positive line 97 (+60 volts, for example). The operating voltage of the incandescent lamp 96 appropriately lies within the range of the operating voltage for the system; in the example given, a 60-volt, 10-watt lamp, for example, may be used. In operation, the capacitor 92 is charged to the line potential (60 volts) through said lamp and the diode 95. The diode 95 functions to prevent the flow of equalizing current from the capacitor to the windings 89 or 90.

The windings 90 and 89, which are connected in series with the windings 91 and 88, respectively, are connected to the junction 94. Winding 88 is connected to the collector lead of a controllable semiconductor element 98, and winding 91 to the collector of a controllable semiconductor element 99. The emitter leads of elements 98 and 99, which may be transistors in a Darlington circuit as shown, are connected to a reference potential, such as ground. The control leads of the semiconductor elements (e.g., the base electrodes thereof) are connected to protective diodes 102 and 103, respectively, for protection against induced interfering voltages. Moreover, a no-load diode 104 is connected in parallel with the series-connected windings 88 and 89, and a no-load diode 105 is connected in parallel with the series-connected windings 90 and 91.

The protective diodes 102 and 103 couple AND circuits 106 and 107, respectively, to the semiconductor elements. Each AND circuit has three inputs. A zener diode 108, which in series with a resistor 109 is connected in parallel with capacitor 92, serves to supply the AND circuits with a stable voltage. Between said zener diode and the AND circuit 106 lies a resistor 110, and between said zener diode and the AND circuit 107, a resistor 111.

One input each of the AND circuit 106 and 107 is supplied from a cut-off line 112 whereby the magnetizing means may be blocked.

The other two inputs of AND circuit 106 are supplied from control lines 113 and 114, respectively, and the other two inputs of AND circuit 107 are supplied from control lines 115 and 116, respectively.

When in operation, if a magnetization of north polarity, for example, is to be produced on the belt 10, a positive potential is applied to lines 113 and 114 for a definite period of time, for example, 0.01 seconds, so that the diodes of AND circuit 106 are cut off, provided that the cut-off line 112 also has a positive potential applied thereto. The control input of the controllable semiconductor element 98 then receives control current through the resistor 110, with the result that semiconductor element 98 becomes conducting and capacitor 92, which had been previously charged to the operating voltage via lamp 96 and diode 95, discharges through the windings 89 and 88 and the semiconductor element 98 so that the belt 10 is correspondingly magnetized. This discharge is interrupted after a period of time determined by timing element 53 (FIG. 1), following which a decaying current will continue to flow for a short period through the diode 104.

During the time that semiconductor element 98 was conducting, as determined by the timing element 53, the capacitor was able to discharge only by about 5 percent to 30 percent, and preferably by about 10 percent; in other words, if its voltage was 60 volts before discharge, it now is reduced to 53 volts after discharge. The voltage applied across the incandescent lamp 96 now is only about 7 volts, so that it does not light up and maintains its low positive-temperature-coefficient (PTC) resistance which will permit the capacitor 92 to recharge within a very short time.

Magnetization of south polarity is produced analogously by applying a positive potential to control lines 115 and 116 to render the semiconductor element 99 conductive.

If one of the semiconductor elements should become defective for some reason and conduct constantly, the capacitor 92 will be almost completely discharged. The incandescent lamp 96 then receives practically the full operating voltage, 60 volts, for example, so that it lights up brightly, with its resistance increasing about twelvefold so that only a small current of, say, 160 milliamperes can flow through it to the windings, and this will not overload the respective windings in any way. The incandescent lamp will similarly receive substantially the full operating voltage when the seimiconductor elements operate properly but the capacitor is defective, such as open-circuited. The lamp will, in that instance, light brightly during the brief interval that the semiconductor elements are activated.

As the lamp lights up, it is visible from an operator's position through the window 75, thus providing an optical fault indication. Faulty delivery of the articles conveyed caused by improper magnetization of the belt 10 cannot occur here since the low current of, say, 106 mA cannot produce adequate magnetization, and the respective parcels will travel unaffected to the end of the run, where a limit switch, for example, may be provided that will actuate an alarm or automatically stop the belt 10.

If the semiconductor element 98 or 99 should briefly become conducting due to interfering pulses such as those frequently generated by magnetic valves, this will not result in any malfunctioning, either, as during these short interfering pulses the current in the windings 88 and 89 or 90 and 91, respectively, can rise only to a low value and at the end of the interfering pulse is immediately interrupted. Thus, no faulty magnetization is produced in the belt, and this, too, contributes to the dependable operation of the system in accordance with the invention.

Thus, the invention provides by simple means, substantially enhanced operational reliability.

While the invention has been particularly shown and described with reference to a preferred embodiment, it will be obvious to those skilled in the art that various changes and modifications in form and details may be made without departing from the spirit and scope of the invention. It is therefore intended that the appended claims be interpreted as including all such changes and modifications.

What is claimed is:

1. An article conveying system for conveying articles from a loading station to one of a plurality of receiving stations, comprising: a conveyor belt having an article conveying run for conveying said articles, said conveyor belt containing magnetizable material adapted to be selectively magnetized in discrete areas, the selective magnetization representing a selected one of said receiving stations; sensing means disposed at each of said receiving stations for sensing said selective magnetization, said sensing means at each of said receiving stations detecting a predetermined magnetization associated with that receiving station, means to discharge articles from said conveyor belt at the selected receiving stations in response to the respective sensing means, and magnetizing means for selectively magnetizing said conveyor belt to thereby select a predetermined receiving station to which each of said articles is respectively directed, said magnetizing means including electromagnet means having magnetizing windings through which magnetizing current selectively flows, a chargeable capacitor, circuit means including controllable semiconductor means for selectively enabling said magnetizing current to flow from said capacitor through said windings; and a charging circuit connected to said capacitor, said charging circuit including a positive-temperature-coefficient resistance means.

2. An article conveying system in accordance with claim 1 wherein said positive-temperature-coefficient resistance means comprises an incandescent lamp.

3. An article conveying system in accordance with claim 1 wherein said charging circuit further includes a diode connected in series with said positive-temperature-coefficient resistance means for preventing the flow of equalizing current from said capacitor to said windings.

4. An article conveying system in accordance with claim 1 wherein said electromagnet means includes a first set of windings adapted, when energized, to produce magnetization of a first polarity in said conveyor belt means, and a second set of windings adapted, when energized, to produce magnetization of an opposite polarity in said conveyor belt means; and said controllable semiconductor means comprises first and second semiconductor means connected to said first and second sets of windings, respectively, to selectively establish first and second discharge paths for said capacitor, whereby said magnetizing current selectively flows through said first and second sets of windings.

5. An article conveying system in accordance with claim 4 and further comprising selective energizing means connected to said first and second semiconductor means for selectively energizing same to thereby establish said first and second capacitor discharge paths.

6. An article conveying system for conveying articles from a loading station to one of a plurality of receiving stations, comprising: a conveyor belt having an article conveying run for conveying said articles, said conveyor belt containing magnetizable material adapted to be selectively magnetized in discrete areas, the selective magnetization representing a selected one of said receiving stations; sensing means disposed at each of said receiving stations for sensing said selective magnetization, said sensing means at each of said receiving stations detecting a predetermined magnetization associated with that receiving station; means to discharge articles from said conveyor belt at the selected receiving stations in response to the selective sensing means; and magnetizing means for selectively magnetizing said conveyor belt to thereby select a predetermined receiving station to which each of said articles is respectively directed, said magnetizing means including electromagnet means having magnetizing windings through which magnetizing current selectively flows, a chargeable capacitor, circuit means including controllable semiconductor means for selectively enabling said magnetizing current to flow from said capacitor through said windings; and a charging circuit connected to said capacitor, said charging circuit including an incandescent lamp through which a first current flows to recharge said capacitor, and a second current flows in response to a defect in said magnetizing means, said second current being sufficient to light said incandescent lamp so as to indicate said defect.

7. An article conveying system in accordance with claim 6 further including timing means for selectively energizing said controllable semiconductor means for a predetermined interval of time; and wherein said capacitor exhibits a capacitance value such that it is discharged during said predetermined interval of time to a value that defines a potential across said incandescent lamp that is less than the minimum potential necessary for said incandescent lamp to light.

8. An article conveying system for conveying articles from a loading station to one of a plurality of receiving stations, comprising: a conveyor belt having an article-conveying run for conveying said articles, said conveyor belt containing magnetizable material adapted to be selectively magnetized in discrete areas, the selective magnetization representing a selected one of said receiving stations; sensing means disposed at each of said receiving stations for sensing magnetization, said sensing means at each of said receiving stations detecting a predetermined magnetization associated with that receiving station; means to discharge articles from said conveyor belt at the selected receiving stations in response to the respective sensing means; and plural magnetizing means for selectively magnetizing said conveyor belt to thereby select a predetermined receiving station to which each of said articles is respectively directed, each of said magnetizing means including electromagnet means having a U-shaped core, the end faces of said core facing the surface of said conveyor belt means, and magnetizing windings wound about said U-shaped core and through which magnetizing current selectively flows, a chargeable capacitor, circuit means including controllable semiconductor means for selectively enabling said magnetizing current to flow from aid capacitor through said windings; and a charging circuit connected to said capacitor, said charging circuit including a positive-temperature-coefficient resistance means.

9. A conveying system in accordance with claim 8 wherein said magnetizing windings wound about said U-shaped core comprise a first pair of series-connected windings, one of said first pair being wound about one leg of said U-shaped core and the other of said first pair being wound about the other leg of said U-shaped core, said first pair of windings being adapted, when energized to produce magnetization of first polarity in said conveyor belt means; and said magnetizing windings further comprise a second pair of series-connected windings one of said second pair being wound about one leg of said U-shaped core and the other of said second pair being wound about the other leg of said U-shaped core, said second pair of windings being adapted, when energized, to produce magnetization of an opposite polarity in said conveyor belt means.

10. An article conveying means in accordance with claim 9 wherein said controllable semicoductor means comprises first and second semiconductor means connected to said first and second pairs of windings, respectively, to selectively establish first and second discharge paths for said capacitor, whereby said magnetizing current selectively flows through said first and second pairs of windings.

11. An article conveying system in accordance with claim 8 and further comprising a replaceable circuit board upon which said electromagnet means, said semiconductor means said capacitor and said positive-temperature-coefficient resistance means are mounted.

12. An article conveying system in accordance with claim 11 wherein said circuit board is disposed in depending relation with respect to said surface of said conveyor belt means, and wherein said electromagnet means is mounted at one end of said circuit board so that the legs of said U-shaped core extend from said circuit board toward said surface such that said end faces of said core face said surface.

13. An article conveying system in accordance with claim 8 wherein said end faces of said U-shaped core lie in a plane that is substantially parallel to the direction of travel of said conveyor belt means.

14. In a system for controlling the delivery of articles by a conveyor wherein the conveyor belt is magnetizable, in combination with the conveyor belt, magnetizing means, a plurality of detector units positioned respectively in predetermined relationships with respect to article-discharge zones, each of said detector units having detector means which is responsive to a particular magnetic signal which identifies its article-discharge zone, said magnetizing means comprising a capacitor and an electromagnet assembly having windings and control circuits which are operative to discharge said capacitor through the respective windings and thereby provide an impulse of magnetic flux and produce a magnetic signal area having a specific location relative to the position of an article on the belt and having a code identification with the detector unit at a selected article-discharge zone, and means constituting a capacitor charging circuit connected to said capacitor and adapted to charge said capacitor at a current-flow level which is substantially less than the level of current which flows from said capacitor through said windings, said charging circuit including a positive-temperature-coefficient resistor.

15. The system described in claim 14 wherein said resistor is an incandescent lamp haing resistance and current flow characteristics whereby it carries the normal charging current for said capacitor without lighting but which is lighted when a faulty operating condition exists in said capacitor or in the said control circuits for said windings.

16. The system as described in claim 14 wherein said resistor acts as signal means to produce a signal when there is a fault in the associated components, and wherein said capacitor has characteristics relative to those of said charging circuit and said windings such that the current producing a signal impulse does not reduce its voltage charge sufficiently to cause an increase in the current flow through said charging circuit above said signal level.

* * * * *